(12) United States Patent
Church et al.

(10) Patent No.: US 6,318,195 B1
(45) Date of Patent: Nov. 20, 2001

(54) METHOD OF INSTALLING A LIGHT PROBE

(75) Inventors: Bryan Robert Church, Simpsonville; Gary Francis Fitzsimmons, Mauldin; David Martin Gontz, Simpsonville, all of SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/703,671

(22) Filed: Nov. 2, 2000

Related U.S. Application Data

(62) Division of application No. 09/292,471, filed on Apr. 15, 1999, now Pat. No. 6,182,520.

(51) Int. Cl.[7] .................................................. G01M 15/00
(52) U.S. Cl. ............................................................ 73/866.5
(58) Field of Search ................................. 73/866.5, 166, 73/117.3; 356/241.1, 241.2, 241.5

(56) References Cited

U.S. PATENT DOCUMENTS

| | | | |
|---|---|---|---|
| 4,337,648 | * | 7/1982 | Gillespie ............................. 73/117.3 |
| 4,441,021 | * | 4/1984 | Olson et al. ......................... 73/117.3 |
| 4,484,469 | * | 11/1984 | Grover et al. ....................... 73/117.3 |
| 4,516,425 | * | 5/1985 | Chollet et al. ....................... 73/866.5 |
| 4,569,228 | * | 2/1986 | Bellgardt et al. ................... 73/866.5 |
| 4,680,960 | * | 7/1987 | Yamanaka et al. ................. 73/117.3 |
| 4,970,907 | * | 11/1990 | Flynn ................................... 73/866.5 |
| 5,131,284 | * | 7/1992 | Radzuin et al. ..................... 73/866.5 |
| 5,349,850 | * | 9/1994 | Young .................................... 73/116 |

* cited by examiner

Primary Examiner—Robert Raevis
(74) Attorney, Agent, or Firm—Nixon & Vanderhye P.C.

(57) ABSTRACT

A light probe assembly for mounting in a casing wall comprising a swage lock fitting sized to receive an outer tube; a light probe extending through the fitting and received within the outer tube; wherein the fitting is adapted for attachment to the casing wall, and wherein a remote end of the light probe is seated on an internal shoulder at a forwardmost end of the outer tube.

3 Claims, 1 Drawing Sheet

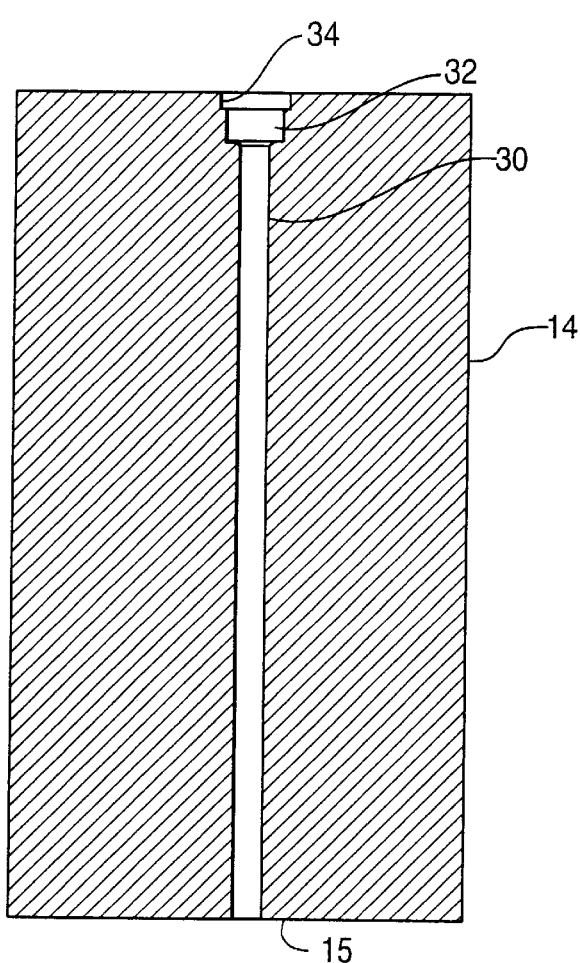
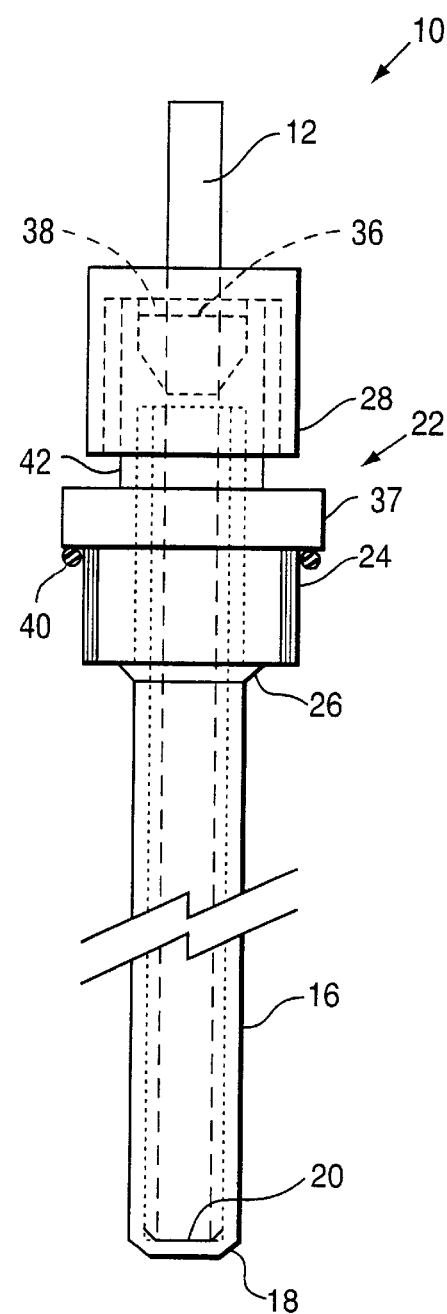
Fig. 2
Fig. 1

METHOD OF INSTALLING A LIGHT PROBE

This application divisional Ser. No. 09/292,471 filed Apr. 15, 1999, U.S. Pat. No. 6,182,520.

TECHNICAL FIELD

This invention relates to a light probe assembly for measuring displacement (vibration) of gas turbine compressor blades, and related installation process.

BACKGROUND AND SUMMARY OF THE INVENTION

Light probes are currently used to measure vibration in jet engine compressor blades, as a replacement or supplement to, the use of more costly strain gauges. Light probes also have the advantage of measuring vibration in all of the blades on a wheel which realistically cannot be accomplished with strain gauges. On the other hand, the ability to locate the light probes accurately and securely is critical to acquiring reliable data. Typical installations require many probes which make the installation cost a real concern. Various mounting techniques for light probes have been developed, but these have not been satisfactory in all respects.

In one prior installation, a 0.94 inch diameter probe was inserted in a 0.105 inch diameter hole in a compressor casing wall. The procedure did not provide for accurate placement, and vibration of the probe itself within the hole created the potential for "white noise" in the results. In addition, air pressure against the probe could result in movement of the probe outside of its measurement range.

Other mounting techniques include the use of threaded inserts, but these require additional machining and multi-piece assemblies which create the potential for debris entering the flowpath.

The present invention seeks to alleviate the installation problems experienced in the past by providing an inexpensive, pressure tight, and reliable assembly and related installation process for light probes used particularly for measuring displacement of land based gas turbine compressor blades.

In accordance with an exemplary embodiment of the invention, a light probe is fitted into a tube, with the forward end of the tube swaged to retain the light probe within a few thousandths of an inch from the tube end. The light probe and surrounding tube are installed in the compressor casing wall by means of a conventional swage lock pressure fitting. During installation, the forward end of the tubing surrounding the light probe is bottomed against the swaged end of the surrounding tube, with the forward edge of the tube flush with the casing inner wall, so that the probe is maintained at a predetermined distance from the inner casing wall, and hence the compressor blades. Tightening of the swage lock cap forms a pressure sealed assembly.

Accordingly, in its broader aspects, the present invention relates to a light probe assembly for mounting in a casing wall comprising a swage lock fitting sized to receive an outer tube; a light probe extending through the fitting and received within the outer tube; wherein the fitting is adapted for attachment to the casing wall, and wherein a remote end of the light probe is seated on an internal shoulder at a forwardmost end of the outer tube.

In another aspect, the invention relates to a method of installing a light probe in a casing wall comprising a) attaching an elongated tube having a crimped remote end to a fitting body; b) attaching the fitting to the casing wall; c) attaching a separable cap portion of the fitting onto the light probe; and d) inserting the light probe and cap portion into the fitting body with a remote end of the light probe seated on the crimped remote end of the tube.

Other features and advantages of the invention will become apparent from the detailed description which follows.

BRIEF DESCRIPTION OF THE DRAWINGS

FIG. 1 is a side elevation of a light probe and mounting hardware in accordance with an exemplary embodiment of the invention;

FIG. 2 is a side elevation of a compressor casing wall, illustrating the counterbored holes used to facilitate mounting of the light probe assembly shown in FIG. 1.

DETAILED DESCRIPTION OF THE INVENTION

With reference to FIG. 1, the light probe assembly 10 includes a conventional light probe 12 which is to be installed within a compressor casing wall 14 (FIG. 2) in the manner described further hereinbelow. The light probe in the exemplary embodiment has a diameter of 0.094 inch, allowing it to fit snugly within a 1/8 (0.125) inch diameter tube surrounding tube 16. The forward end of the tube 14 is swaged or crimped inwardly as shown at 18 so that the forward edge 20 of the light probe 12 can be bottomed within the tube 16, thus retaining the light probe at a predetermined distance (less than 0.010 inch) from the outer forward edge of the tube 16, and ultimately, from the flowpath when the tube end is arranged flush with the interior surface of the casing wall 14.

A swage lock pressure fitting 22 is used to create a pressure tight mounting of the light probe within the casing wall 14. The latter may be between about 2 and about 10 inches thick. The swage lock fitting includes a lower part 24 secured to the tube 16 by brazing as shown at 26. The tube and light probe extend through the fitting 24, with the proximate end of the tube 16 terminating within an upper part 28 of the fitting 22. The light probe 12 extends upwardly from the end of the tube 16 and out of the upper fitting part 28 with leads (not shown) connected to an otherwise conventional control set-up. The fitting 22 may be a conventional Swagelok® fitting Model Number SS-200-1-0084.

Turning to FIG. 2, the casing wall 14 is bored to provide a 1/8 inch clearance diameter throughhole 30 (i.e., the hole 30 will receive a 1/8 inch diameter tube) counterbored at 32 to receive the fitting lower part 24. The outermost portion of the casing wall is further counterbored to provide an enlarged diameter portion 34 adapted to receive the enlarged head 36 of the lower fitting part 24.

The installation process for accurately locating the light probe 12 within the casing wall 14 is as follows. After drilling the 1/8 inch clearance hole 30 in the casing wall, the 1/4 inch counterbore 32 is formed with an internal thread to receive the exteriorly threaded fitting lower part 24. Counterbore 34 is formed to receive the enlarged head 37. The fitting 22 is then installed within the counterbore 32 and torqued to specification. The 1/8 inch tube 16 is then inserted through the fitting lower part 22, with the swaged end 18 first, until the tube end is flush with the inner surface 15 of the casing wall. The swage lock fitting 22 is tightened in the usual manner to slightly swage and thus temporarily lock the 1/8 inch tubing into its final position within the fitting.

The swage lock fitting 22 and ⅛ inch tubing is then removed from the casing wall as an assembly, so that the tube 16 can be brazed to the lower or forward end of the lower part 24 as shown at 26, thus fixing the tube 16 relative to the lower fitting part 24. The swage lock cap or upper part 28 and associated ferrules 36, 38, preferably brass, are removed and the upper end of the tube 16 is then machined below the seat of the ferrules 36, 38 in the upper part 28, i.e., the upper end of tube 16 will remain below the ferrules 36, 38. In this way, ferrule 36 may be tightened down and locked in place via ferrule 38 to thereby capture the light probe 12 in the fitting without engaging the upper end of the tube 16. Before inserting the light probe 12, however, 0.094 inch diameter trial rod is inserted to verify that the light probe will fit into the ⅛ inch tube and will seat properly at the bottom of the tube.

Thereafter, the swage lock fitting 22 and tube 16 is reinstalled into the casing wall 14 and torqued to specification, with an O-ring 40 located below head 36 so as to seal the assembly to the casing wall at the interface of counterbores 34 and 32. The swage lock upper part 28 and ferrules, 36, 38 are installed onto the light probe 12 and the light probe is then inserted into the tube 16 until the probe bottoms at the swaged end 18 of the tube 16. The fitting upper part or cap 28 is then tightened by threading down over an intermediate fitting part 42, over the ferrules with the lower edge of probe 12 seated at the crimped end of tube 16 which, in turn, is flush with the interior surface 15 of the casing wall. In this way, the location of the lower tip of the light probe can reliably and repeatedly be located at a predetermined distance, e.g. <0.010 inch from the flowpath inside the casing.

If necessary, the light probe leads (not shown) are coated with Nichrome to reduce any risk of damage to the leads.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of installing a light probe in a bore formed in a casing wall comprising:
   a) attaching an elongated tube having a crimped forwardmost end to a fitting body;
   b) attaching the fitting body within the bore in the casing wall;
   c) attaching a separable cap portion of the fitting body onto the light probe; and
   d) inserting the light probe through the fitting body with a remote end of the light probe seated on the crimped forwardmost end of said tube and with said crimped forwardmost end of said tube flush with an inner surface of the casing wall.

2. The method of claim 1 wherein, prior to step a), the fitting body is temporarily secured in the casing wall and the elongated tube is inserted through the fitting to a predetermined location flush with an interior surface of the casing wall to thereby locate the tube at a desired position relative to the fitting body; and wherein the fitting body and elongated tube are removed from the casing wall and the elongated tube is fixed to the fitting body at said desired position.

3. The method of claim 1 wherein, during step d), the light probe is secured within said fitting body independently of said elongated tube.

* * * * *

UNITED STATES PATENT AND TRADEMARK OFFICE
CERTIFICATE OF CORRECTION

PATENT NO. : 6,318,195 B1
DATED : November 20, 2001
INVENTOR(S) : Church et al.

It is certified that error appears in the above-identified patent and that said Letters Patent is hereby corrected as shown below:

Column 2,
Line 26, delete "1/18" and insert -- 1/8 --.

Signed and Sealed this

Twenty-sixth Day of March, 2002

Attest:

JAMES E. ROGAN
Attesting Officer    Director of the United States Patent and Trademark Office

UNITED STATES PATENT AND TRADEMARK OFFICE
CERTIFICATE OF CORRECTION

| | | |
|---|---|---|
| PATENT NO. | : 6,318,195 B1 | Page 1 of 1 |
| APPLICATION NO. | : 09/703671 | |
| DATED | : November 20, 2001 | |
| INVENTOR(S) | : Church et al. | |

It is certified that error appears in the above-identified patent and that said Letters Patent is hereby corrected as shown below:

In Column 1, immediately below the title, insert:

--The Government of the United States of America has rights in this invention pursuant to Contract No. DE-FC21-95MC31176 awarded by the U. S. Department of Energy.--

Signed and Sealed this

Twentieth Day of February, 2007

JON W. DUDAS
*Director of the United States Patent and Trademark Office*